May 2, 1939.  W. R. THOMAS  2,157,033
ROAD MAP
Filed Aug. 18, 1937
Fig. 1.
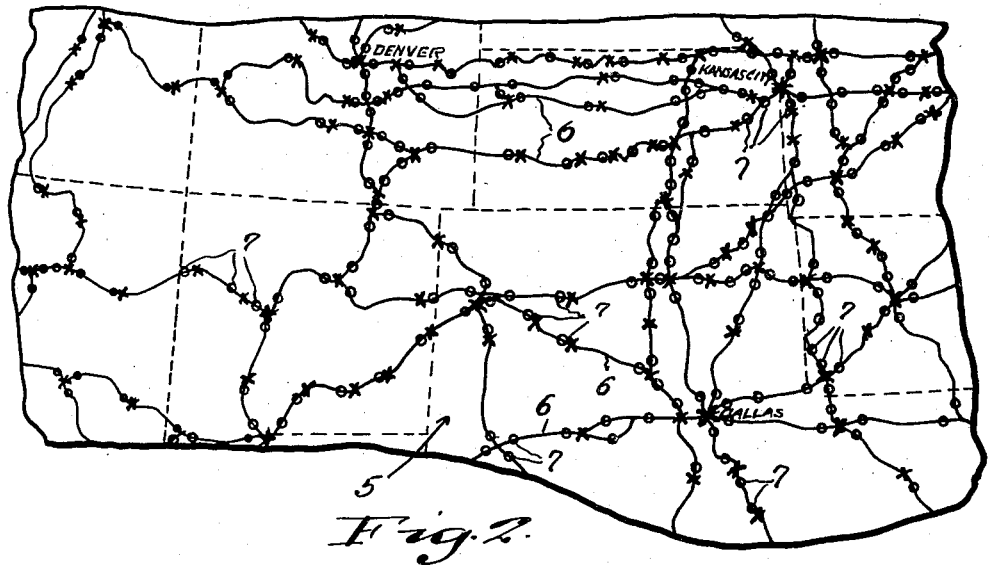
Fig. 2.
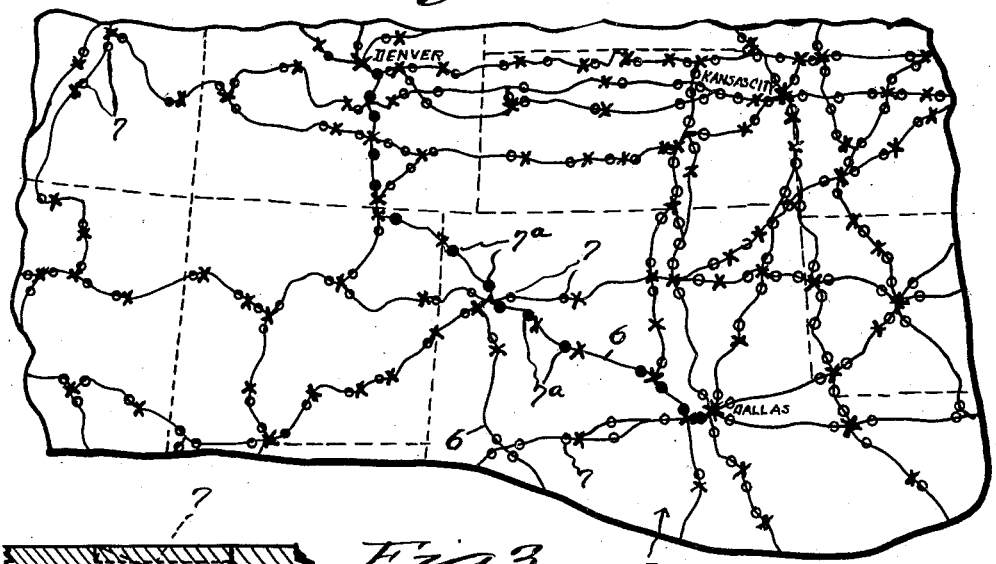
Fig. 3.
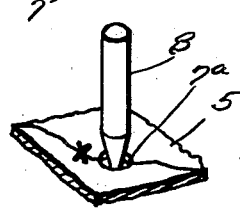
Fig. 4.
Inventor
W. R. Thomas
By Clarence A. O'Brien
Hyman Berman
Attorneys Patented May 2, 1939

2,157,033

UNITED STATES PATENT OFFICE 2,157,033

ROAD MAP

William R. Thomas, Rapid City, S. Dak.

Application August 18, 1937, Serial No. 159,767

2 Claims. (Cl. 35—40)

This invention relates to what is believed to be a unique road map possessed of features of newness rendering it more satisfactorily usable to facilitate systematic planning for automobile tours, and the general objective of the broad concept is to utilize readily visible perforations to facilitate following predetermined routes and to better indicate that part of the route already traversed and to show plainly the remaining portion of the route to be subsequently covered.

As implied by the preceding paragraph, I have reference to those types of road maps such as are used by automobile service stations, automobile associations, and others, as advertising media. Moreover, the preferred embodiment of the broad conception has reference to what may be called a "punch-your-route" map, that is to say, a map constructed in accordance with the principles here under consideration which has scored or partially perforated punch-outs occurring at principal points, such as the largest cities, the punch-outs being located wherever necessary or desired to expedite determination of locations and to enable one to expeditiously find his way in a safe, reliable, readily visible manner.

Other features and advantages will become more readily apparent from the following description and accompanying illustrative drawing.

In the drawing, wherein the preferred embodiment of the invention is illustrated:

Figure 1 is an example illustration of a map ordinary in any sense of the word except it includes the improved scored or part-perforated discs which are punched out as the route is covered.

Figure 2 is a view like Figure 1 showing certain of the tabs or discs punctured or punched out in accordance with my conception.

Figure 3 is an enlarged or exaggerated fragmentary sectional view showing the part-perforated discs in normal position, in full lines and partly punched out in dotted lines.

Figure 4 is a perspective view showing how a pencil or other instrument may be conveniently used to puncture the map at the readily disruptible tab or disc points.

In so far as the map itself in concerned, it is here denoted, as a unit, by the numeral 5. Manifestly, this may be of any appropriate foldable pocket-type, or may be so-called carboard strip maps, or otherwise. In so far as the construction of the map itself is concerned as to charting or diagrammatic lay-out, this is of no importance, and in the present invention almost any map could be converted to comply with the requirements of this invention. By preference, however, the various routes 6 will have the names of cities and towns printed thereon, and at the larger towns will be the so-called "punch-outs" 7. These will be distributed along the various routes, the idea being that as the distance is covered, part-perforated discs 7 are punched out with a pencil 8, as shown for example in Figure 4. To be more specific, the preferred embodiment of the invention comprises the disruptible disc-like areas 7 located at predetermined points. These are scored around their marginal edges so that a slight pressure of the point of a pencil may be sufficient to force the disc through and out. In practice I have found that it is possible to simply attach the paper disc to the body of the paper on one side, that is, at one point, since it will normally be flat and will not get out of place even though the map is of a foldable type. However, it may be advisable to attach the disc, so to speak, at diametrically opposite points so that there will be no chance of these "plugs" being accidentally punctured.

It is within the concept of the invention to prepuncture the entire map over its complete route area. Or, it is also deemed to be within the principles of the concept to have the route planned by one familiar with it, such as for example a service station attendant, or a route clerk in an automobile association, or similar place of business. In other words, if one is desirous of taking a short trip of two or three hundred miles, and desires to ascertain the best route available at the time, the distributor of the map, having a proper punching instrument, can partially punch out these spots or discs 7 so that as each particular large town is passed the driver of the car can punch out the disc, leaving a plain visible hole showing the territory already covered, whereby to safely and conveniently focus his eye on the territory yet to be covered. This makes it possible to tell at a glance just how the planned tour is taking effect.

It seems reasonable also to assume that it is within the limits of this invention to provide a road or route map and to completely punch out the "route holes" at the agency or starting point for the entire route, whereby to provide clear holes which may be readily checked to facilitate safe and unconfused traveling. Manifestly, everything that contributes to safety on highways these days is a factor worthy of consideration, and it is thought that this map, especially when used by the driver of the car, will promote safe and dependable progress.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. A road map comprising a sheet having applied thereon a map of a selected area including markings designating cities and towns and line markings indicating roads connecting said cities and towns, said sheet having weakened portions providing removable parts intersected by the line markings and located adjacent the markings designating the cities and towns, whereby a person after traveling over a selected road and on reaching a city or town may punch out the removable part adjacent said city or town to clearly indicate at a glance thereafter the route traversed by observing the openings made in the sheet by the parts removed therefrom.

2. A road map comprising a sheet having applied thereon a map of a selected area including markings designating cities and towns and line markings indicating roads connecting said cities and towns, said sheet having weakened portions providing parts intersected by the line markings and located adjacent the markings designating the cities and towns and being connected on said sheet at diametrically opposite edges thereof, whereby a person familiar with the best roads connecting selected cities and towns may detach one edge of each part intersected by the line markings representing the selected roads to position said latter-named parts at an angle to the sheet whereby another person may easily pick out and follow the selected roads from the other roads shown on the map and whereby the latter-named person may entirely remove the partly detached parts as the cities and towns on the selected roads are reached to clearly indicate at a glance thereafter the route traversed by observing the openings made in the sheet by the completely removed parts and the rest of the route to be traveled by the remaining partly detached parts.

WILLIAM R. THOMAS.